US012698228B2

(12) United States Patent
Knoche et al.

(10) Patent No.: US 12,698,228 B2
(45) Date of Patent: Aug. 4, 2026

(54) METHOD OF MAKING A GLASS PRODUCT, AND A GLASS PRODUCT

(71) Applicant: Schott AG, Mainz (DE)

(72) Inventors: Stefan Knoche, Mainz (DE); Matthias Kaffenberger, Mainz-Ebersheim (DE); Stefan Bauer, Hüffelsheim (DE); Stefan Schmitt, Stadecken-Elsheim (DE); Michael Hahn, Hohenstein (DE); Volker Ohmstede, Bingen (DE); Ralph Seuwen, Schwabenheim (DE)

(73) Assignee: SCHOTT AG, Mainz (DE)

( * ) Notice: Subject to any disclaimer, the term of this patent is extended or adjusted under 35 U.S.C. 154(b) by 562 days.

(21) Appl. No.: 17/940,261

(22) Filed: Sep. 8, 2022

(65) Prior Publication Data

US 2023/0082588 A1    Mar. 16, 2023

(30) Foreign Application Priority Data

Sep. 8, 2021    (EP) ..................................... 21195639
Dec. 22, 2021    (EP) ..................................... 21217184

(51) Int. Cl.
| | |
|---|---|
| *C03C 3/087* | (2006.01) |
| *C03B 5/235* | (2006.01) |
| *C03C 3/11* | (2006.01) |
| *C03C 3/118* | (2006.01) |

(52) U.S. Cl.
CPC ............ *C03B 5/2353* (2013.01); *C03C 3/087* (2013.01); *C03C 3/11* (2013.01); *C03C 3/118* (2013.01); *C03B 2211/40* (2013.01)

(58) Field of Classification Search
CPC .......................... C03C 1/00; C03C 3/085–093
See application file for complete search history.

(56) References Cited

U.S. PATENT DOCUMENTS

| | | | |
|---|---|---|---|
| 4,632,687 A | 12/1986 | Kunkle et al. | |
| 4,704,153 A | 11/1987 | Schwenninger et al. | |
| 8,574,765 B2 | 11/2013 | Kikuya et al. | |
| 2002/0033030 A1* | 3/2002 | Kawaguchi ........... | C03B 5/2252 65/134.2 |

(Continued)

FOREIGN PATENT DOCUMENTS

JP        2009523697 A    6/2009

OTHER PUBLICATIONS

Ni. Carbon in Silicate Melts. Reviews in Mineralogy & Geochemistry vol. 75 pp. 251-287, 2013. (Year: 2013).*

(Continued)

*Primary Examiner* — Matthew E. Hoban
(74) *Attorney, Agent, or Firm* — TAYLOR & EDELSTEIN, PC

(57) ABSTRACT

A method of making a glass product includes the steps of: melting a batch of a plurality of glass raw materials in a melting tank to form a glass melt; heating at least one of the plurality of glass raw materials and the glass melt using at least one fuel burner by reacting hydrogen and oxygen; withdrawing the glass melt from the melting tank; obtaining a glass product, the glass product having an $Fe^{2+}$ to $Fe^{3+}$ ratio of less than 0.2 or less than 0.05 and having at least one of less than 80 bubbles in a size range of from 0.1 mm to 0.2 mm per 10 kg of glass and less than 2 bubbles of a size larger than 0.2 mm per 10 kg of a glass.

19 Claims, 1 Drawing Sheet

(56) References Cited

U.S. PATENT DOCUMENTS

| | | |
|---|---|---|
| 2004/0042746 A1* | 3/2004 | Atkins ................. C03B 37/014 |
| | | 65/416 |
| 2007/0122332 A1 | 5/2007 | Jacques et al. |
| 2011/0135938 A1 | 6/2011 | Kim et al. |
| 2018/0208495 A1* | 7/2018 | Matsuo ................... C03C 3/091 |
| 2022/0371941 A1 | 11/2022 | Kii et al. |

OTHER PUBLICATIONS

PhD Thesis of Christopher Charles Tournour, "Solubility and Diffusion of Gases in Glasses and Melts", Alfred University, New York, Jul. 2004, chapters 3.2 to 3.4. (218 pages).
European Search Report dated Feb. 24, 2022 for European Patent Application No. 21195639.6 (4 pages).
European Office Action dated Mar. 9, 2022 for European Patent Application No. 21195639.6 (5 pages).
European Search Report dated Jun. 7, 2022 for European Patent Application No. 21217184.7 (7 pages).
"Solubilities of Gases In Glass Melts", Fritz Krämer, D-55270 Klein-Winternheim (FRG) (94 pages).
"Sodium Silicate", Wikipedia, last modified Aug. 5, 2021, retrieved from https://de.wikipedia.org/w/index.php?title=Natriumsilicate&oldid=214511064 (4 pages).

* cited by examiner

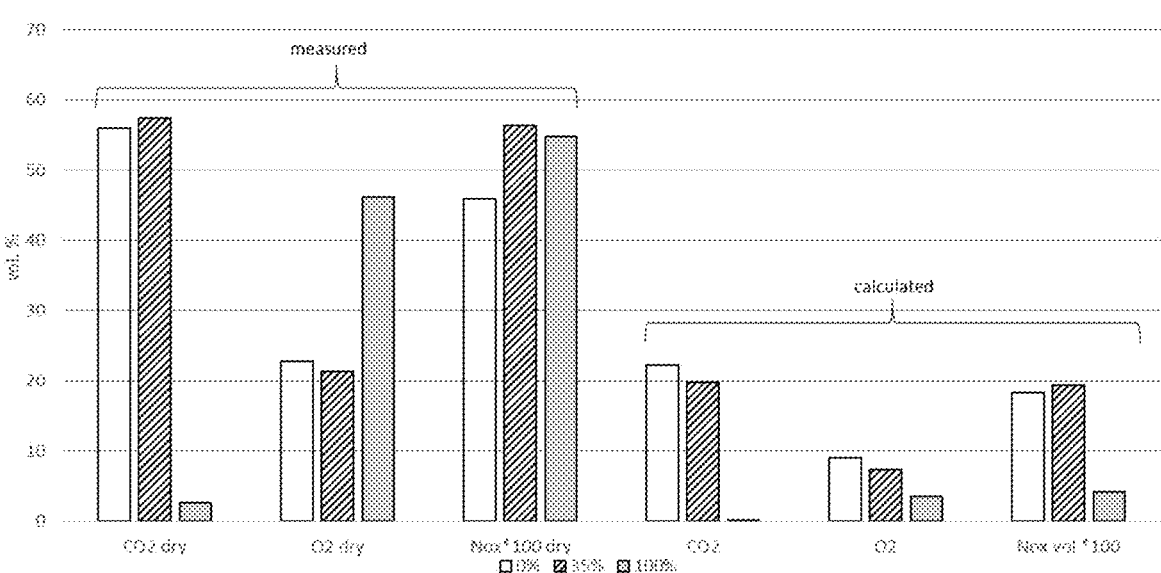
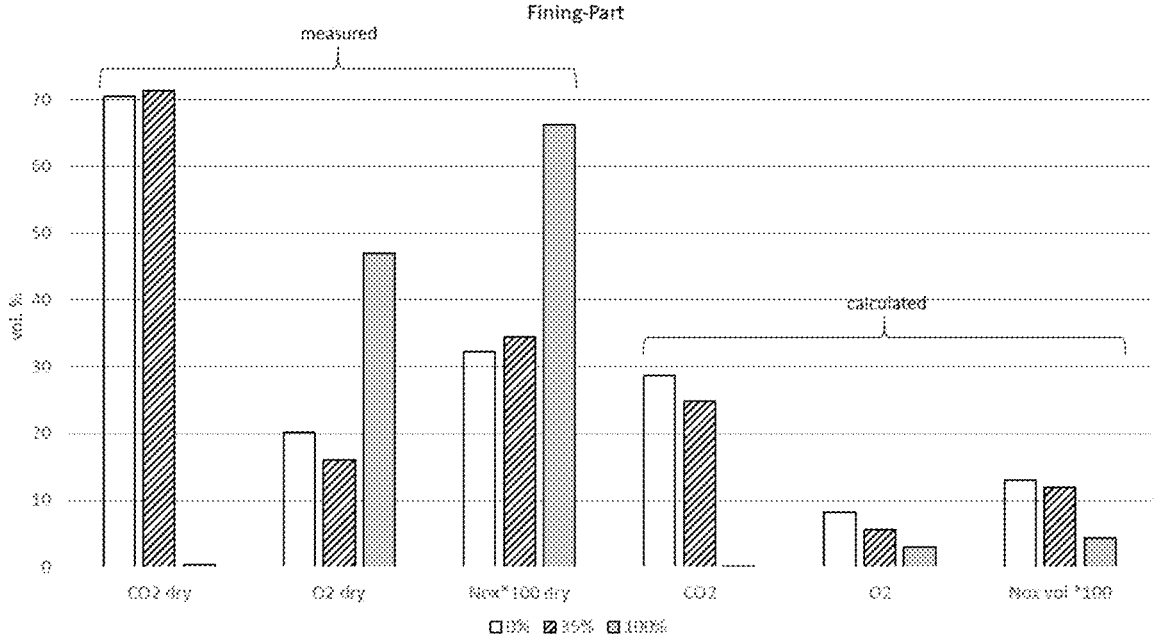

METHOD OF MAKING A GLASS PRODUCT, AND A GLASS PRODUCT

CROSS REFERENCE TO RELATED APPLICATIONS

This claims priority to (a) European patent application no. EP 21195639.6, filed Sep. 8, 2021, which is incorporated herein by reference, and (b) European patent application no. EP 21217184.7, filed Dec. 22, 2021, which is incorporated herein by reference.

BACKGROUND OF THE INVENTION

1. Field of the Invention

The present invention relates to methods of making a glass product, wherein the glass product has an $Fe^{2+}$ to $Fe^{3+}$ molar ratio of less than 0.2; and to a glass product with a low $CO_2$ solubility and/or a reduced total carbon content, wherein the $CO_2$ solubility is less than $5 \cdot 10^{19}$ molecules $CO_2$ $bar^{-1}$ $cm^{-3}$ at 1100° C. and wherein the glass product has an $Fe^{2+}$ to $Fe^{3+}$ ratio of less than 0.2. The glass product further excels by a reduced number of bubbles and/or a reduced size of the bubbles in the glass product.

2. Description of the Related Art

Glass compositions are widely known and available with a diverse range of desired properties for a plethora of tailored applications in industry and households. Some glass compositions are relatively easy to manufacture in sufficient quality depending on the desired use and application, whereas others require sophisticated equipment and/or extremely well balanced production processes.

For example, glass compositions used to make drinking glasses and ordinary windowpanes are of the first type because the glasses used for these products have fairly low melting temperatures and are characterized by a steep viscosity-temperature curve. Also the quality criteria of these products are not very stringent, e.g. ordinary windowpanes and drinking glasses may contain occasional bubbles, and slight variations in shape and dimension are tolerable.

The quality required for a given product depends on its intended use. For certain applications, high-quality glasses are required that do not contain occasional bubbles and have to satisfy further stringent criteria, e.g. regarding their shape and dimensional variations. High-quality glasses are often difficult to manufacture, not only because of the mentioned criteria but also because of high melting temperatures required during their manufacture to achieve melt viscosities sufficient for homogenization and removal of bubbles from the melt.

Accordingly, there is still a desire to overcome the drawbacks of the prior art.

What is needed in the art is a process for the production of a glass product which avoids and/or minimizes the problem of bubble formation. What is also needed is a process for the production of a glass product in which both the number of bubbles in the glass product and their size is reduced simultaneously.

SUMMARY OF THE INVENTION

In a first aspect, the present invention relates to a method of making a glass product, including the steps of:

melting a batch of glass raw materials in a melting tank to form a glass melt;

heating the glass raw materials and/or the glass melt using at least one fuel burner;

withdrawing the glass melt from the melting tank;

obtaining a glass product, wherein the fuel burner heats the glass raw materials and/or the glass melt by reacting hydrogen and oxygen and wherein the glass product has an $Fe^{2+}$ to $Fe^{3+}$ ratio of less than 0.2, or less than 0.05.

The inventors have established that the provided method reduces the number and size of the gas bubbles in the glass product. The inventors have also established that the provided method of making a glass product is technically feasible.

In a second aspect, the present invention relates to a glass product including a composition, wherein the glass product has an $Fe^{2+}$ to $Fe^{3+}$ ratio of less than 0.2, or less than 0.05, wherein the glass product has less than 80 bubbles in a size range of from 0.1 mm to 0.2 mm per 10 kg of glass and/or less than 2 bubbles of a size larger than 0.2 mm per 10 kg of glass.

In a third aspect, the present invention relates to a method of making a glass product, including the steps of:

melting a batch of glass raw materials in a melting tank to form a glass melt;

heating the glass raw materials and/or the glass melt using at least one fuel burner;

withdrawing the glass melt from the melting tank;

obtaining a glass product, wherein the fuel burner heats the glass raw materials and/or the glass melt by reacting hydrogen and oxygen and wherein the glass product has a composition exhibiting a $CO_2$ solubility of less than $5 \cdot 10^{19}$ molecules $CO_2$ $bar^{-1}$ $cm^{-3}$ glass melt at 1100° C. and/or a total carbon content of less than 310 ppm, based on the weight of the carbon atoms with respect to the weight of the glass product.

In a fourth aspect, the present invention relates to a method of making a glass product, including the steps of:

melting a batch of glass raw materials in a melting tank to form a glass melt;

heating the glass raw materials and/or the glass melt using at least one fuel burner;

withdrawing the glass melt from the melting tank;

obtaining a glass product, wherein the fuel burner heats the glass raw materials and/or the glass melt by reacting hydrogen and oxygen with an oxygen-fuel equivalence ratio $\lambda$ of >1.00.

In a fifth aspect, the present invention relates to a glass product including a composition, wherein the glass product has a composition exhibiting a $CO_2$ solubility of less than $5 \cdot 10^{19}$ molecules $CO_2$ $bar^{-1}$ $cm^{-3}$ glass melt at 1100° C. and/or a total carbon content of less than 310 ppm, based on the weight of the carbon atoms with respect to the weight of the glass product.

The glass product may have a low $CO_2$ solubility and also a reduced total carbon content. The glass product further excels by a reduced number of bubbles and the size of the bubbles in the glass product.

Definitions and Methods

A "glass melt" is a volume of a batch of glass raw materials that has a viscosity of less than $10^{7.6}$ dPas.

A "melting tank" is a vessel used for melting glass. The vessel defines a volume that can contain a glass melt. The melting tank may have a substantially rectangular base, or bottom plate, in particular for continuous melting processes. Alternatively, the melting tank may have a substantially round base or a substantially polygonal base, in particular used for discontinuous melting processes. It may have walls to keep the melt within the tank. Typically, a melting tank will not be filled to the rim. A melting tank may have a cover above the glass melt surface ("covered melting tank"). The cover may be vaulted. The "melting tank" may be a part of a larger melting facility, which may include further parts such as a refining tank or refining area. Some melting facilities have a combined tank with different sections, one section for melting and one for refining, in which case the "melting tank" according to this disclosure relates to the whole combined tank including the refining section.

The "bottom plate" is a part of the melting tank that forms the bottom of the tank. The bottom plate may be a single piece of material. Alternatively, the bottom plate may be composed of a plurality of parts or sections. The bottom plate may be closed, i.e. essentially impermeable to the glass melt. Alternatively, the bottom plate may have a closable opening so that glass melt may be withdrawn from the melting tank through the bottom opening.

A "bubble" is a gaseous inclusion within the glass or the glass melt, optionally having a diameter of at least 10 μm. The "diameter" means the largest diameter of the gaseous inclusion. Whenever in this description reference is made to "bubble" it can be understood as gas bubble in its broadest meaning, but also as "$CO_2$ bubble" in a more specific meaning.

The "oxygen-fuel equivalence ratio λ" defines the amount of oxygen present to react with a combustible compound ("fuel") and thus convert the fuel into combustion products. Accordingly, λ=1.00 is at stoichiometry, whereas rich mixtures with respect to the amount of fuel have a λ<1.00, and lean mixtures have a λ>1.00. Lean mixtures with λ>1.00 thus enable a full or complete conversion of the fuel into combustion products, such as $CO_2$ or $H_2O$ as the case may be, while retaining some excess amount of oxygen.

The viscosity can for example be measured using a rotational viscosimeter, e.g. as described in DIN ISO 7884-2:1998-2. The dependence of the viscosity on the temperature is described according to the VFT equation (Vogel-Fulcher-Tammann).

Where reference is made to "oxygen", "hydrogen", "$CO_2$" and other gases, this should be understood to include gas mixtures which contain a predominant proportion of that specific gas, in particular more than 50 vol. %, 60 vol. %, 70 vol. %, 80 vol. %, 90 vol. %, 95 vol. %, 99 vol. %, 99.5 vol. % or essentially 100.0 vol. %. In particular, the terms mentioned also refer to so-called "technical" gases with corresponding specifications.

Where reference is made to "ppm" in the context of solids or liquids, this should be understood as 'weight/weight' (w/w). Where reference is made to "ppm" in the context of gases, this should be understood as 'volume/volume' (vol/vol).

Where reference is made to individual chemical species, such as e.g. an amount of carbonate in the batch of glass raw materials of less than 15 wt. %, this should be understood as the weight of that chemical species, e.g. $CO_3^{2-}$, which can be calculated as the number of moles of that chemical species multiplied with its molar mass, divided by the total weight of the batch of glass raw materials, the amount of carbonate being less than 15 wt. %.

Glass raw materials shall be understood as any chemical component that is suitable, in combination with other similar components, to form a glass melt and, optionally after reactions have taken place in the glass melt, a glass product. Examples of glass raw materials used in the context of the present invention include, but are not limited to, the oxides of metals and metalloids, the nitrates of metals and metalloids, and the carbonates of metals and metalloids.

If this description refers to a glass composition which is essentially free of a component or does not contain a certain component, or includes the hypothetical case of 0 weight % of that component, it is to be understood that this component may at most be present as an impurity. This means that it is not added in significant quantities and that it is not added intentionally. The term "component" refers to the elemental species as such as well as any molecule containing the element. Non-essential amounts are to be understood as less than 100 ppm, optionally less than 50 ppm, and optionally less than 10 ppm, based on the weight percentage with respect to all intentionally added components.

"Dwelling time" is the time that a given portion of the glass melt spends in the melting tank before being withdrawn from the melting tank. Dwelling time can be measured using so-called tracers, i.e. components that are added to the glass melt so that they can be detected in the product, allowing conclusions as to the time spent in the melting tank. Examples of tracer compounds are Ca, Sr and Y. The "minimum dwelling time" is the time that a portion of glass melt needs to travel through the melting tank taking the fastest path, i.e. the time between addition of an amount of tracer compound into the melting tank and the first occurrence of the tracer in the product. The "hydrodynamic dwelling time" is defined as the ratio between the "melting tank volume [$m^3$]" and the "melting tank throughput [$m^3$ $h^{-1}$]". The "average dwelling time" is defined as the expected value of the residence time distribution obtained and determined in a tracer experiment. The "hydrodynamic dwelling time" and the "average dwelling time" are the same, provided that the "melting tank throughput" is constant over the entire melting tank. In case of doubt, any reference to "dwelling time" in this disclosure relates to the hydrodynamic dwelling time.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein:

FIG. 1 shows dry measurements of flue gas compositions originating from domestic gas combustion and hydrogen combustion, using oxygen from air fractionation (e.g. 95.5 vol. % $O_2$, 2 vol. % $N_2$, 2.5 vol. % Ar).

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

In one aspect, the present invention relates to a method of making a glass product, including the steps of:
    melting a batch of glass raw materials in a melting tank to form a glass melt;
    heating the glass raw materials and/or the glass melt using at least one fuel burner;

withdrawing the glass melt from the melting tank;

obtaining a glass product, wherein the fuel burner heats the glass raw materials and/or the glass melt by reacting hydrogen and oxygen and wherein the glass product has an $Fe^{2+}$ to $Fe^{3+}$ ratio of less than 0.2, or less than 0.05.

The method of this invention allows establishing and/or adjusting a partial oxygen pressure in the glass melt which simultaneously provides for suitable refining conditions in the glass melt and low bubble counts in the obtained glass product. The method allows for a very broad range of oxygen-fuel equivalence ratios $\lambda$ because it employs hydrogen and oxygen for heating. In contrast, methods that rely on heating with conventional fuel, e.g. natural gas, cannot be applied with high oxygen-fuel equivalence ratios $\lambda$ because excessive concentrations of nitrous oxides ($NO_x$) will form in the flue gas. $NO_x$ is toxic and its emission is limited by law in many jurisdictions. The method of this disclosure uses hydrogen and oxygen for heating, mainly resulting in the formation of water as a combustion product. Additionally, the method allows for an oxygen partial pressure that avoids CO- and C-formation. CO and C deteriorate platinum parts by alloy formation. The method of this disclosure avoids the need for a large excess of oxygen required to circumvent the undesirable formation of CO and carbon during processes known in the art.

In one embodiment of this disclosure, the glass melt and/or the glass product has an $Fe^{2+}$ to $Fe^{3+}$ ratio of less than 0.2, less than 0.15, less than 0.10, or less than 0.05, and/or an $Fe^{2+}$ to $Fe^{3+}$ ratio of at least 0.005, or at least 0.01. In a related embodiment, the glass melt and/or the glass product has an $Fe^{2+}$ to $Fe^{3+}$ ratio of 0.005 to 0.2, or 0.01 to 0.05. The $Fe^{2+}$ to $Fe^{3+}$ ratio is the ratio of the molar amounts of $Fe^{2+}$ and $Fe^{3+}$ in the melt and/or product. The $Fe^{2+}$ to $Fe^{3+}$ ratio may serve as a fingerprint for the partial oxygen concentration during manufacturing.

The method of this invention is suitable for making a glass product with very low bubble count. Optionally, the glass compositions include only limited amounts of carbonate in the batch of glass raw materials. The composition of the glass may be such that the glass melt and/or the glass product has a $CO_2$ solubility of less than $5 \cdot 10^{19}$ molecules $CO_2$ $bar^{-1}$ $cm^{-3}$ glass melt at 1100° C., less than $4 \cdot 10^{19}$ molecules $CO_2$ $bar^{-1}$ $cm^{-3}$ glass melt at 1100° C., less than $3 \cdot 10^{19}$ molecules $CO_2$ $bar^{-1}$ $cm^{-3}$ glass melt at 1100° C., or less than $2 \cdot 10^{19}$ molecules $CO_2$ $bar^{-1}$ $cm^{-3}$ glass melt at 1100° C. The composition of the glass product may be such that the glass melt has a $CO_2$ solubility of at least $1 \cdot 10^{15}$ molecules $CO_2$ $bar^{-1}$ $cm^{-3}$ glass melt at 1100° C., at least $1 \cdot 10^{16}$ molecules $CO_2$ $bar^{-1}$ $cm^{-3}$ glass melt at 1100° C., or at least $1 \cdot 10^{17}$ molecules $CO_2$ $bar^{-1}$ $cm^{-3}$ glass melt at 1100° C. The composition of the glass product may be such that the glass melt has a $CO_2$ solubility of from $1 \cdot 10^{15}$ to $5 \cdot 10^{19}$ molecules $CO_2$ $bar^{-1}$ $cm^{-3}$ glass melt at 1100° C., $1 \cdot 10^{16}$ to $4 \cdot 10^{19}$ molecules $CO_2$ $bar^{-1}$ $cm^{-3}$ glass melt at 1100° C., or $1 \cdot 10^{17}$ to $3 \cdot 10^{19}$ molecules $CO_2$ $bar^{-1}$ $cm^{-3}$ glass melt at 1100° C.

Where reference is made to "glass composition", it is to be understood as the oxide composition of the glass after melting the batch of glass raw materials and solidifying the melt to obtain the glass product. This means that any volatile components are in the gaseous state and that the metals and metalloids are present in the glass compositions as oxides and/or fluorides. In other words, the "glass composition" is the combination of oxides and/or fluorides that can be obtained by melting a glass product and/or glass article.

The glass compositions according to the present invention may contain high amounts of $SiO_2$ and $B_2O_3$. Thereby, very high quality glass products are obtainable. Particularly, glass products produced by the method and/or glass products described herein may have particularly low bubble counts, specifically particularly low $CO_2$ bubble counts.

The glass composition may be borosilicate, aluminoborosilicate, aluminosilicate glass or lithium aluminosilicate (LAS) glass. The glass composition may contain alkali metal oxides, such as e.g. $Li_2O$, $Na_2O$, and $K_2O$, in amounts of less than 20% by weight, less than 15% by weight, less than 12% by weight, less than 10% by weight or less than 5% by weight. Optionally, the glass composition may be free of alkali metal oxides. In alternative embodiments, the amount of alkali metal oxides in the glass composition may be at least 1% by weight. Advantageously, a low amount of alkali metal oxides contributes to a low $CO_2$ solubility in the glass melt.

The glass composition may contain alkali earth metal oxides, such as e.g. MgO, CaO, SrO, BaO, in amounts of less than 20% by weight, less than 15% by weight, less than 12% by weight, less than 10% by weight, or less than 5% by weight. Optionally, the glass composition may be free of alkali earth metal oxides. In alternative embodiments, the amount of alkali earth metal oxides in the glass composition may be at least 1% by weight.

The glass composition may contain iron, calculated as $Fe_2O_3$, in an amount of less than 0.05% by weight, less than 0.01% by weight, or less than 0.005% by weight. In one embodiment, the glass composition may contain $Fe_2O_3$ in an amount of at least 0.0005% by weight, at least 0.001% by weight, or at least 0.002% by weight. In related embodiments, the glass composition may contain $Fe_2O_3$ in an amount of 0.0005% to 0.05% by weight, 0.001% to 0.01% by weight, or 0.002% to 0.005% by weight. The amount of $Fe_2O_3$ as indicated above relates to the total weight of the total iron in the glass composition, as if present in the form of the $Fe_2O_3$ oxide. This does not mean that all of the iron is present in this form. For example, any iron in the FeO form is included.

In a further embodiment, the glass composition may contain $Fe_2O_3$ in an amount of less than 1000 ppm by weight, less than 500 ppm by weight, or less than 200 ppm by weight. Optionally, the glass composition may contain $Fe_2O_3$ in an amount of at least 1 ppm by weight, at least 10 ppm by weight, or at least 50 ppm by weight. In related embodiments, the glass composition may contain $Fe_2O_3$ in an amount of 1 to 1000 ppm, in an amount of 10 to 500 ppm, or in an amount of 50 to 200 ppm.

The glass composition may contain $SiO_2$ in an amount of at least 48% by weight, at least 55% by weight, at least 65% by weight, at least 70% by weight or at least 75% by weight. Optionally, the amount of $SiO_2$ may range up to 90% by weight, up to 87.5% by weight, up to 85% by weight, up to 82.5% by weight, or up to 80% by weight.

Optionally, the glass composition may be that of a glass ceramic, i.e. a glass composition that can be further processed into a glass ceramic by appropriate heat treatment. In case that the glass composition is that of a glass ceramic, the composition may contain nucleating agents such as $TiO_2$ and/or $ZrO_2$. Optionally, the total amount of $TiO_2$ and/or $ZrO_2$ may be at least 2.0% by weight, such as at least 2.5% by weight. Optionally, the total amount of $TiO_2$ and/or $ZrO_2$ may be less than 7.0% by weight, or less than 5.0% by weight. The glass composition may for example be a lithium aluminosilicate glass composition, e.g. containing at least 2.0% by weight of $Li_2O$.

Optionally, the glass compositions include $Al_2O_3$ in an amount of at least 1.5% by weight or at least 5.0% by weight or even at least 10.0% by weight. The amount of $Al_2O_3$ may be up to 25.0% by weight, up to 23.0% by weight, up to 20.0% by weight or up to 18.0% by weight. In certain embodiments, the amount of $Al_2O_3$ may range from 1.5% to 23.0% by weight, from 5.0% to 20.0% by weight, or from 10.0% to 18.0% by weight.

Additionally or alternatively, the glass composition may include $B_2O_3$ in an amount of at least 0.5% by weight, at least 8.0% by weight, or at least 10.0% by weight. The amount of $B_2O_3$ may be up to 25.0% by weight, up to 23.0% by weight, up to 20.0% by weight, up to 18.0% by weight, up to 16.0% by weight or up to 14.0% by weight. In certain embodiments, the amount of $B_2O_3$ may range from 0.5% to 20.0% by weight, from 8.0% to 16.0% by weight, or from 10.0% to 14.0% by weight.

Many highly viscous glass compositions contain significant amounts of $SiO_2$, $Al_2O_3$ and $B_2O_3$. Optionally, the glass compositions used in this invention have a total content of $SiO_2$, $Al_2O_3$ and $B_2O_3$ of at least 75.0% by weight, at least 78.0% by weight, at least 80.0% by weight, at least 82.0% by weight, or at least 85.0% by weight. The total amount of $SiO_2$, $Al_2O_3$ and $B_2O_3$ may be limited to not more than 97.0% by weight, up to 93.5% by weight, or up to 90.0% by weight. Optionally, the amount of $SiO_2$, $Al_2O_3$ and $B_2O_3$ may range from 75.0% to 95.0% by weight, from 78.0% to 92.5% by weight or from 85.0% to 90.0% by weight.

In one embodiment, the glass composition may be a lithium aluminosilicate glass including from 3.0 to 4.2% $Li_2O$ by weight, from 19 to 23% $Al_2O_3$ by weight, from 60 to 69% $SiO_2$ by weight, optionally including $TiO_2$ and/or $ZrO_2$, optionally including from 2.0 to 4.0% $TiO_2$ and/or $ZrO_2$.

In certain embodiments, the glass composition may be—alternatively or in addition to the previously mentioned compositional features—be characterized by the compositional ranges indicated in the tables that follow.

In one embodiment, the glass composition may be a borosilicate glass including the following components in % by weight:

| | |
|---|---|
| $SiO_2$ | 70.0 to 87.0 |
| $B_2O_3$ | 7.0 to 25.0 |
| $Na_2O + K_2O$ | 0.5 to 9.0 |
| $Al_2O_3$ | 0.0 to 7.0 |
| CaO | 0.0 to 3.0 |

In one embodiment, the glass composition may be a borosilicate glass including the following components in % by weight:

| | |
|---|---|
| $SiO_2$ | 70.0 to 86.0 |
| $Al_2O_3$ | 0.0 to 8.0, or 0.0 to 5.0 |
| $B_2O_3$ | 9.0 to 25.0 |
| $Na_2O$ | 0.5 to 8, or 0.5 to 5.0 |
| $K_2O$ | 0.0 to 1.0 |
| $Li_2O$ | 0.0 to 2, or 0.0 to 1.0 |

In a specific embodiment, the glass composition may be a borosilicate glass including the following components in % by weight:

| | |
|---|---|
| $SiO_2$ | 70.0 to 80.0, or 71.0 to 77.0 |
| $Al_2O_3$ | 3.0 to 8.0, or 3.5 to 8.0 |
| $B_2O_3$ | 9.0 to 15, or 9.0 to 12.0 |
| $Na_2O$ | 5.5 to 8.0 |
| $K_2O$ | 0.0 to 1.0, or 0.1 to 0.5 |
| $Li_2O$ | 0.0 to 0.5, or 0.0 to 0.3 |
| CaO | 0.0 to 3.0, or 0.0 to 1.5 |
| BaO | 0.0 to 1.5 |
| F | 0.0 to 0.3 |
| $Cl^-$ | 0.0 to 0.3 |
| MgO + CaO + BaO + SrO | 0.0 to 2.0 |

In another embodiment, the glass composition may be an alkali borosilicate glass including the following components in % by weight:

| | |
|---|---|
| $SiO_2$ | 78.3 to 81.0 |
| $Al_2O_3$ | 3.5 to 5.3 |
| $B_2O_3$ | 9.0 to 13.0 |
| $Na_2O$ | 3.5 to 6.5 |
| $K_2O$ | 0.3 to 2.0 |
| CaO | 0.0 to 2.0 |

In an alternative embodiment, the glass composition may be an alkali borosilicate glass including the following components in % by weight:

| | |
|---|---|
| $SiO_2$ | 55.0 to 85.0 |
| $Al_2O_3$ | 0.0 to 15.0 |
| $B_2O_3$ | 3.0 to 20.0 |
| $Na_2O$ | 3.0 to 15.0 |
| $K_2O$ | 3.0 to 15.0 |
| ZnO | 0.0 to 12.0 |
| $TiO_2$ | 0.5 to 10.0 |
| CaO | 0.0 to 0.1 |

In a further embodiment, the glass composition may include the following components in % by weight:

| | |
|---|---|
| $SiO_2$ | 58.0 to 75.0 |
| $Al_2O_3$ | 18.0 to 25.0 |
| $Li_2O$ | 3.0 to 6.0 |
| $Na_2O + K_2O$ | 0.1 to 2.0 |
| MgO + CaO + BaO + ZnO | 1.5 to 6.0 |
| $TiO_2 + ZrO_2$ | 2.0 to 6.0 | and optionally, coloring agents such as oxides of Co, Ni, Fe, Nd, Mo and other suitable coloring agents. Optionally, the glass may contain refining agents such as $SnO_2$, Cl, $As_2O_5$, and/or $Sb_2O_5$. The total amount of refining agents may be from 0.1-1.5% by weight. The amount of $SnO_2$ may be 0.1-1.5% by weight, and/or the amount of $As_2O_5$ may be 0.1-1.5% by weight, and/or the amount of $Sb_2O_5$ may be 0.1-1.5% by weight.

In one embodiment, the glass composition may include the following components in % by weight:

| | |
|---|---|
| $SiO_2$ | 58.0 to 65.0 |
| $Al_2O_3$ | 14.0 to 25.0 |
| $B_2O_3$ | 6.0 to 10.5 |

-continued

| | |
|---|---|
| MgO | 0.0 to 3.0 |
| CaO | 0.0 to 9.0 |
| BaO | 3.0 to 8.0 |
| ZnO | 0.0 to 2.0 | wherein the sum of MgO, CaO and BaO is from 8.0 to 18.0% by weight.

In a further embodiment, the glass composition may include the following components in % by weight:

| | |
|---|---|
| $SiO_2$ | 50.0 to 68.0, or 55.0 to 68.0 |
| $Al_2O_3$ | 15.0 to 20.0 |
| $B_2O_3$ | 0.0 to 6.0 |
| $Li_2O$ | 0.0 to 6.0 |
| $Na_2O$ | 1.5 to 16.0, or 8.0 to 16.0 |
| $K_2O$ | 0.0 to 5.0 |
| MgO | 0.0 to 5.0 |
| CaO | 0.0 to 7.0, or 0.0 to 1.0 |
| ZnO | 0.0 to 4.0, or 0.0 to 1.0 |
| $ZrO_2$ | 0.0 to 4.0 |
| $TiO_2$ | 0.0 to 1.0, or essentially free of $TiO_2$ |

The present invention includes melting a batch of glass raw materials in a melting tank to form a glass melt, as well as heating the glass raw materials and/or the glass melt using at least one fuel burner. These two process steps require a lot of energy. To some extent sufficiently high temperatures are needed for gas bubbles, such as e.g. $CO_2$ bubbles, to leave the melt.

The method further includes a step, wherein the fuel burner heats the glass raw materials and/or the glass melt by reacting hydrogen and oxygen. Both the hydrogen and oxygen may be obtained from renewable sources. In one embodiment hydrogen and oxygen are obtained at least partially from electrolysis, i.e. electrochemical conversion of water into hydrogen and oxygen, and in a further embodiment hydrogen and oxygen are obtained essentially fully from electrolysis. If the electrolysis of water is operated by use of regenerative energy, the production of hydrogen and oxygen is essentially emission-free.

It is advantageous that the fuel burner heats the glass raw materials and/or the glass melt by reacting hydrogen and oxygen because it reduces and/or minimizes the production of $CO_2$ within the method of making a glass product. This is particularly advantageous if gas exchange between the glass melt and the flue gas originating from the heating and melting steps is possible.

In one embodiment of this disclosure, the glass melt and/or the glass product are characterized by a temperature dependence of the $CO_2$ solubility of the composition in a temperature range. The temperature range includes temperatures where the composition is in the form of a glass melt. This does not mean that the method necessarily includes heating the melt to each and every temperature within that range. Instead, it describes a property of the composition in that range. A temperature dependence of the $CO_2$ solubility may exceed $2 \cdot 10^{14}$ molecules $CO_2$ $bar^{-1}$ $cm^{-3}$ $K^{-1}$ in a temperature range of from 1000 to 1600° C. In a further embodiment, the temperature dependence of the $CO_2$ solubility may exceed $5 \cdot 10^{14}$ molecules $CO_2$ $bar^{-1}$ $cm^{-3}$ $K^{-1}$ in a temperature range of from 1000 to 1600° C., or may exceed $1 \cdot 10^{15}$ molecules $CO_2$ $bar^{-1}$ $cm^{-3}$ $K^{-1}$ in a temperature range of from 1000 to 1600° C. In a related embodiment, the temperature dependence of the $CO_2$ solubility may be less than $1 \cdot 10^{18}$ molecules $CO_2$ $bar^{-1}$ $cm^{-3}$ $K^{-1}$ in a temperature range of from 1000 to 1600° C., less than $1 \cdot 10^{17}$ molecules $CO_2$ $bar^{-1}$ $cm^{-3}$ $K^{-1}$ in a temperature range of from 1000 to 1600° C., or less than $5 \cdot 10^{16}$ molecules $CO_2$ $bar^{-1}$ $cm^{-3}$ $K^{-1}$ in a temperature range of from 1000 to 1600° C. In related embodiments of the method, the temperature dependence of the $CO_2$ solubility may be between $2 \cdot 10^{14}$ molecules $CO_2$ $bar^{-1}$ $cm^{-3}$ $K^{-1}$ and $1 \cdot 10^{18}$ molecules $CO_2$ $bar^{-1}$ $cm^{-3}$ $K^{-1}$ in a temperature range of from 1000 to 1600° C., between $5 \cdot 10^{14}$ molecules $CO_2$ $bar^{-1}$ $cm^{-3}$ $K^{-1}$ and $1 \cdot 10^{17}$ molecules $CO_2$ $bar^{-1}$ $cm^{-3}$ $K^{-1}$ in a temperature range of from 1000 to 1600° C., or between $1 \cdot 10^{15}$ molecules $CO_2$ $bar^{-1}$ $cm^{-3}$ $K^{-1}$ and $5 \cdot 10^{16}$ molecules $CO_2$ $bar^{-1}$ $cm^{-3}$ $K^{-1}$ in a temperature range of from 1000 to 1600° C. This temperature dependence of the $CO_2$ solubility is advantageous as it provides for optimal degassing of the glass melt in the temperature range of from 1300 to 1650° C. In this context, the skilled artisan knows and appreciates that the $CO_2$ solubility decreases with increasing temperatures. Depending on the viscosity-temperature behavior of the glass melt, it is also advantageous that the temperature dependence of the $CO_2$ solubility exceeds $2 \cdot 10^{14}$ molecules $CO_2$ $bar^{-1}$ $cm^{-3}$ $K^{-1}$ in a temperature range of from 1000 to 1600° C. The composition of the glass melt can be engineered in such a way as to provide for a lowered viscosity in a temperature range of from 1300 to 1650° C., which provides for more efficient and faster degassing of the glass melt in this temperature range.

In one embodiment of the method, the amount of carbonate, i.e. $CO_3^{2-}$, in the batch of glass raw materials is less than 8 wt. %, less than 5 wt. %, less than 3 wt. %, less than 1.0 wt. %, less than 0.3 wt. %, less than 0.1 wt. %. In a further embodiment of the method, the amount of carbonate in the batch of glass raw materials is at least 0.001 wt. %, at least 0.003 wt. %, at least 0.01 wt. %, at least 0.03 wt. %, or at least 0.05 wt. %. In a related embodiment of the method, the amount of carbonate in the batch of glass raw materials is between 0.001 and 8 wt. %, between 0.001 and 5 wt. %, between 0.003 and 3 wt. %, between 0.01 and 1.0 wt. %, between 0.03 and 0.3 wt. %, or between 0.05 and 0.1 wt. %. Carbonates may be present in the batch of glass raw materials intentionally or as impurities. Because of the high temperatures in the glass melt, carbonates tend to decompose and will generate $CO_2$ (bubbles) in the glass melt. It is advantageous to reduce the amount of carbonate in the batch of glass raw materials because less $CO_2$ (bubbles) will be generated and released into the glass melt. More $CO_2$ (bubbles) generated and released into the glass melt necessitates longer dwelling times of the glass melt in the melting tank between the heating and/or melting step using at least one fuel burner and the withdrawing step of the glass melt from the melting tank.

For the production of LAS crystallizable glasses—substrates for further crystallization—it is common to use as raw materials on the one hand, compounds such as carbonates and nitrates and, on the other hand, alumosilicate minerals, e.g. spodumene, petalite or feldspar. A strictly monitored choice of raw materials offers room/potential for reduction of gas release, e.g. reduction of $CO_2$. The share and type of the raw materials in the raw material mix is a criteria for this $CO_2$-release. Analysis and calculations show clearly that by the right choice and control of the raw materials the release of $CO_2$ in the raw material mix of e.g. colored glass ceramics can be reduced to 20% or even <5% of the original release of $CO_2$. For LAS glass ceramics, the reduction of $CO_2$ release can be achieved by substitution of e.g. barium carbonate, sodium carbonate, strontium carbonate, potassium carbonate, lithium carbonate by suited nitrates or alumosilicates.

It is advantageous to include a further step of allowing a dwelling time of the glass melt in the melting tank, in particular before withdrawing the glass melt from the melting tank. The dwelling time may be sufficiently long that more than $1 \cdot 10^{-13}$ mg $CO_2$ per litre, more than $5 \cdot 10^{-13}$ mg $CO_2$ per litre, or more than $1 \cdot 10^{-12}$ mg $CO_2$ per litre of glass melt leave the melt. Optionally less than $2 \cdot 10^{-7}$ mg $CO_2$ per litre, less than $2 \cdot 10^{-8}$ mg $CO_2$ per litre, or less than $2 \cdot 10^{-9}$ mg $CO_2$ per litre of glass melt leave the melt.

In one embodiment of the method, a minimum dwelling time in the melting tank may be set to at least 10 hours (h), at least 12 h or at least 14 h. A sufficient dwelling time is useful for making a high-quality glass product. Optionally, a minimum dwelling time may be up to 70 h, up to 65 h or up to 60 h. Additionally or alternatively, a hydrodynamic dwelling time may be 48 h±12 h. Too long dwelling times are not desirable considering that long dwelling times increase the carbon dioxide footprint of the glass product.

In one embodiment of the method, at least temporarily the fuel burner operates at an oxygen-fuel equivalence ratio λ of >1.00, e.g. more than 1.01, and optionally not more than 1.35. In a further embodiment of the method, at least temporarily the fuel burner operates at an oxygen-fuel equivalence ratio λ of more than 1.03, more than 1.05, or more than 1.1. In a further embodiment of the method, at least temporarily the fuel burner operates at an oxygen-fuel equivalence ratio λ of not more than 1.35, not more than 1.30, not more than 1.25, or not more than 1.20. It is advantageous to adjust the oxygen-fuel equivalence ratio λ in such a way to allow for an oxidative state of the melt. Depending on the type of fuel or fuel mixture used, it is further possible and advantageous to at least temporarily operate the fuel burner at an oxygen-fuel equivalence ratio λ of 1.01 to 1.35, 1.03 to 1.30, 1.05 to 1.25, or 1.05 to 1.20. The skilled artisan knows and appreciates that the partial or exclusive use of hydrogen as a fuel does not require a large excess of oxygen, as opposed to sole use of e.g. fossil fuels, reflected in a suitable oxygen-fuel equivalence ratio λ.

The step of melting a batch of glass raw materials in a melting tank to form a glass melt, and/or the step of heating the glass raw materials and/or the glass melt using at least one fuel burner is optionally carried out by direct heating without flame contact, or alternatively by direct heating where the flame is in the vicinity of the glass raw materials or the glass melt. It may be advantageous to provide for an over-stoichiometric combustion, i.e. an oxygen-fuel equivalence ratio λ of >1.00, e.g. more than 1.01, or respectively to provide for an excess amount of oxygen in the flue gas.

In an embodiment, the method includes the step of electrolyzing $H_2O$ to obtain hydrogen and oxygen, wherein at least a part of the hydrogen and a part of the oxygen is delivered to the fuel burner. In that case it may be necessary or desirable to feed additional oxygen from other sources to guarantee an oxygen-fuel equivalence ratio λ of >1.00, e.g. more than 1.01. The additional oxygen can for example originate from e.g. on-site air decomposers, separate electrolysis or external (e.g. cryogenic) sources.

It is further advantageous that at least temporarily the fuel burner operates at an oxygen-fuel equivalence ratio λ of >1.00, e.g. more than 1.01, because it circumvents and/or removes the requirement for (additional) oxidants, i.e. oxidizing agents such as e.g. nitrates, in the glass melt. A lower amount of nitrates or the complete removal of nitrates provides for less $NO_x$ production during the process.

In one embodiment of the method, a total amount of nitrous oxides in a flue gas resulting from the melting step and the heating step is less than 500 ppm (v/v), less than 300 ppm (v/v), less than 100 ppm (v/v), or less than 50 ppm (v/v) relative to the total volume of the flue gas. In one embodiment of the method, a total amount of nitrous oxides in a flue gas resulting from the melting step and the heating step is at least 1 ppm (v/v), at least 10 ppm (v/v), at least 20 ppm (v/v), or at least 30 ppm (v/v). In a related embodiment of the method, a total amount of nitrous oxides in a flue gas resulting from the melting step and the heating step is from 1 to 500 ppm (v/v), from 10 to 300 ppm (v/v), from 20 to 100 ppm (v/v), or from 30 to 50 ppm (v/v). These nitrous oxides generated during the process are the result of both the (thermal) combustion of $N_2$ and the release of $NO_x$ originating from any nitrates used present in the glass raw materials.

Nevertheless, nitrates present in the glass raw materials also provide for at least a partial oxygen release in the glass melt by virtue of the following reaction (M=metal):

$$M_x(NO_3)_y \rightarrow M_xO + yNO + 0.5yO_2.$$

Oxygen release via nitrates can be advantageous during the melting step, wherein a batch of glass raw materials in a melting tank is molten to form a glass melt, in order to promote (i.e. oxidize) any used fining agents (FA) from their lower-valent form into a higher-valent form. In a subsequent step, accompanied by a sufficient temperature increase, the generated higher-valent forms can be converted back into their lower-valent form under release of oxygen.

During the melting step the following reaction takes place or can take place:

$$FA_xO_y + zO_2 \rightarrow FA_xO_{y+2z}.$$

During a subsequent step, such as e.g. a refining step, with sufficient temperature increase a following reaction takes place or can take place:

$$FA_xO_{y+2z} \rightarrow FA_xO_y + zO_2.$$

In one embodiment of the method, the total amount of nitrous oxides in the flue gas is composed of a portion resulting from oxidation of nitrogen by the fuel burner, and a portion released from nitrogen species contained in the glass raw materials. The skilled artisan appreciates that both processes may take place in the method and that both processes may contribute simultaneously to the generation of the total amount of nitrous oxides. The extent to which nitrous oxide production results from the oxidation of nitrogen by the fuel burner depends on the purity and/or origin of the used oxygen source. For example, oxygen provided from electrolysis generally has a lower amount of nitrogen than oxygen provided from an air separation process, but that will also depend on the exact process and cycle conditions of the electrolysis process and the air separation process. Analogously, the extent to which nitrous oxide production results from nitrogen species contained in the glass raw materials depends on their qualitative and quantitative presence in the used glass raw materials.

In one embodiment of the method, the portion of nitrous oxides resulting from oxidation of nitrogen in the flue gas is less than 200 ppm (v/v), less than 100 ppm (v/v), or less than 50 ppm (v/v). In one embodiment of the method, the portion of nitrous oxides resulting from oxidation of nitrogen is at least 1 ppm (v/v), at least 10 ppm (v/v), at least 20 ppm (v/v), or at least 30 ppm (v/v). In a related embodiment of the method, the portion of nitrous oxides resulting from oxidation of nitrogen is from 1 to 200 ppm (v/v), from 10 to 200 ppm (v/v), from 20 to 200 ppm (v/v), from 20 to 100 ppm (v/v), or from 30 to 50 ppm (v/v).

In one embodiment of the method, the batch of glass raw materials includes at least 0.1 wt. % of nitrate, at least 0.3 wt. % of nitrate, at least 0.5 wt. % of nitrate, at least 1.0 wt. % of nitrate. Optionally, the nitrate is chosen from the list of $NaNO_3$, $KNO_3$, $Ba(NO_3)_2$, $LiNO_3$, $Ca(NO_3)_2$, $Mg(NO_3)_2$ and combinations thereof. In one embodiment of the method, the batch of glass raw materials includes less than 2.0 wt. % of nitrate. Generally, it is desirable and advantageous to minimize the total amount of nitrous oxides emitted during the method. However, it is also advantageous to allow for a refining step of the glass melt in order to obtain a quality increase of the obtained glass product, by providing an additional fining agent in the batch of glass raw materials.

Whereas it is advantageous to minimize the total amount of nitrous oxides emitted during the method, according to one embodiment the portion resulting from oxidation of nitrogen by the fuel burner is reduced, while simultaneously the portion released from nitrogen species contained in the glass raw materials can be increased within the above specified metes and bounds. Alternatively, whereas it is advantageous to minimize the total amount of nitrous oxides emitted during the method, according to one embodiment the portion resulting from nitrogen species contained in the glass raw materials is reduced, while simultaneously the portion generated through oxidation of nitrogen by the fuel burner can be increased within the above specified metes and bounds.

In one embodiment of the method, reacting the hydrogen and the oxygen includes delivering in one or more fuel gas streams to the fuel burner to form a combustion mixture in the fuel burner, wherein the combustion mixture includes at least 10% $H_2$ (v/v), at least 25% $H_2$ (v/v), at least 40% $H_2$ (v/v), at least 45% $H_2$ (v/v), at least 49% $H_2$ (v/v), or at least 49.9% $H_2$ (v/v). In one embodiment of the method, reacting the hydrogen and the oxygen includes delivering in one or more fuel gas streams to the fuel burner to form a combustion mixture in the fuel burner, wherein the combustion mixture includes less than 55% $H_2$ (v/v), less than 50% $H_2$ (v/v), less than 40% $H_2$ (v/v), less than 30% $H_2$ (v/v), less than 20% $H_2$ (v/v), or less than 15% $H_2$ (v/v). In one embodiment of the method, reacting the hydrogen and the oxygen includes delivering in one or more fuel gas streams to the fuel burner to form a combustion mixture in the fuel burner, wherein the combustion mixture includes from 10% to 55% $H_2$ (v/v), from 25% to 50% $H_2$ (v/v), from 40% to 50% $H_2$ (v/v), from 45% to 50% $H_2$ (v/v), from 45% to 50% $H_2$ (v/v), or from 49.9% to 50% $H_2$ (v/v).

In one embodiment of the method, the method includes the step of electrolyzing $H_2O$ to obtain hydrogen and oxygen, wherein at least a part of the hydrogen and a part of the oxygen is delivered to the fuel burner. This is advantageous because electrolytic $H_2/O_2$ mixtures have only a very low $N_2$ content which reduces the generation of nitrous oxides in the flue gas. The formation of thermal nitrogen oxides is thus reduced by providing a nitrogen-free fuel and oxidizing agent. A further advantage of this embodiment is the avoidance of any process-external $O_2$ supply, via e.g. air splitting technologies (Linde process, pressure swing adsorption).

In one embodiment, the method relies exclusively, i.e. to more than 99% (v/v) relative to the total volume of hydrogen and oxygen, on hydrogen and oxygen generated through the electrolysis of $H_2O$. Electrolysis powered through renewable energy inherently provides for a reduction of the environmental burden and a reduction of the carbon dioxide footprint associated with methods of making a glass product. Alternatively, electrolysis can be powered through nuclear energy which provides for a $CO_2$-neutral production of hydrogen. However, because of the radioactive waste this energy source is not sustainable.

It is generally advantageous, if the method relies exclusively on hydrogen and oxygen generated through the electrolysis of $H_2O$. Specifically, the method may rely to at least 80%, at least 90%, at least 95%, at least 99%, or at least 99.9% ((v/v) relative to the total volume of hydrogen and oxygen), on hydrogen and oxygen generated through the electrolysis of $H_2O$. In this context, the skilled artisan is aware that hydrogen and oxygen can also be obtained and/or generated through other sources and ways, such as e.g. air distillation to obtain oxygen, and steam reforming to obtain hydrogen. First, no $CO_2$ is generated during the heating of the glass raw materials and/or the glass melt using at least one fuel burner, and optionally also during the melting of the batch of glass raw materials in a melting tank to form a glass melt. The reduced production of $CO_2$ as part of the method also reduces the amount of $CO_2$ in the glass melt and the final glass product and/or reduces the number and size of the gas bubbles in the glass melt and the final glass product. Second, as described here before, the use of (exclusively) hydrogen and oxygen generated through the electrolysis of $H_2O$ reduces and/or avoids the generation of nitrous oxides during the process which result from the (thermal) combustion of $N_2$, because $N_2$ is hardly present in hydrogen and oxygen obtained via $H_2O$ electrolysis.

The glass melt or the glass composition may include one or more fining agents, sometimes also referred to as refining agents. The fining agent may be selected from multivalent metal oxides, halides, sulfates and combinations thereof. In one embodiment, the fining agent is selected from a list of arsenic oxide, antimony oxide, tin oxide, cerium oxide, chloride, sulfate and combinations thereof. Fining agents are advantageously used to reduce the amount of bubbles in the glass melt and the final glass product. Fining agents generally assist the process of driving out any gases or gas bubbles from a glass melt, such as e.g. $CO_2$ gas bubbles and $O_2$ gas bubbles. Fining agents further assist and affect the general oxidation state in the glass melt, and the obtained glass product, and thus influence and serve to establish a desirable $Fe^{2+}$ to $Fe^{3+}$ ratio.

In the fining temperature range which temperatures lie above the melting temperature any, or at least most, gases remaining in the glass melt are expelled. Each fining agent decomposes at a certain temperature accompanied with the formation of gas which forms bubbles in the glass melt. Due to partial pressure differences, any gases present in the melt diffuse into these gas bubbles which grow and rise to the top of the melt. In order to make this process economically viable, the fining temperature range employs similarly high temperatures as during glass melting, in order to provide a sufficiently low viscosity of the glass melt which facilitates and/or accelerates the rise of the gas bubbles.

In one embodiment of the method, the method further includes the step of releasing oxygen from a nitrate in the glass melt and/or oxidizing at least one polyvalent fining agent in the glass melt. This combination is advantageous because the oxygen is distributed in-situ and with homogeneous distribution within the glass melt, such that an efficient oxidation of a polyvalent fining agent becomes possible. Poly-valent elements present in the melt often provide for a color effect which depends on their concentration as well as their oxidation state. As a general rule of thumb, poly-valent elements in their highest possible oxidation state do not have any d-electrons or s-electrons that would contribute to UV-light or visible light induced transitions in their molecular orbitals. Hence, oxidizing at least one poly-valent element in the glass melt allows establishing a desirable redox state in the glass melt and specifically allows oxidation of poly-valent elements into their highest redox state in order to avoid any color effects of the obtained glass product.

In one embodiment of this disclosure, the glass melt and/or the glass product has an optical transmittance of at least 50%, optionally at least 60%, optionally at least 70%, optionally at least 80%, measured over a wavelength range of 400 to 800 nm, and at a reference glass thickness of 1 mm. In other words, if a glass product is produced from the glass composition, wherein the glass product sample has a thickness of 1 mm, the glass product has an optical transmittance of at least 50%, optionally at least 60%, more optionally at least 70%, optionally at least 80%, measured over a wavelength range of 400 to 800 nm. This feature does not mean that the glass product has a thickness of 1 mm. The 1 mm thickness serves as a reference for comparison. The transmittance may also be measured for example at 2 mm and the 1 mm transmittance calculated using the Beer-Lambert law.

In one embodiment of this disclosure, the glass melt and/or the glass product has a viscosity of $10^2$ dPas at a temperature above 1580° C., and/or the glass melt is heated to a temperature high enough that at least a part of the glass melt has a viscosity of $10^{2.5}$ dPas or less. Advantageously, a glass melt with a viscosity of $10^{2.5}$ dPas or less allows for escape of any gases remaining in the glass melt. It is of particular advantage when fining agents are used as part of the glass raw materials since their decomposition (at a certain temperature) leads to the formation of gas. Due to partial pressure differences, any gases present in the melt diffuse into the (re)fining agent gas bubbles which grow and rise to the top of the melt. At a sufficiently low viscosity of the glass melt, rise of the gas bubbles to the top of the glass melt is facilitated and/or accelerated.

In one embodiment of this disclosure, the glass product is a sheet, a wafer, a plate, a tube, a rod, an ingot or a block. Optionally, the glass melt and/or the glass product has a total carbon content of less than 310 ppm, based on the weight of the carbon atoms with respect to the weight of the glass product or glass melt, respectively. In a further embodiment, the glass melt and/or the glass product has a total carbon content of less than 160 ppm, less than 80 ppm, or less than 30 ppm, based on the weight of the carbon atoms with respect to the weight of the glass product or glass melt, respectively. In a further embodiment, the glass melt and/or the glass product has a total carbon content of at least 1 ppm, at least 2 ppm, at least 3 ppm, or at least 5 ppm, based on the weight of the carbon atoms with respect to the weight of the glass product or glass melt, respectively. In a related embodiment, the glass melt and/or the glass product has a total carbon content of from 1 to 310 ppm, from 2 to 160 ppm, from 3 to 80 ppm, or from 5 to 30 ppm, based on the weight of the carbon atoms with respect to the weight of the glass product or glass melt, respectively. A glass melt and/or a glass product having a limited total carbon content as described herein, based on the weight of the carbon atoms with respect to the weight of the glass product, advantageously has fewer bubbles present in the (obtained) glass product and/or has fewer $CO_2$ bubbles present in the (obtained) glass product. For example, the glass product may include less than 2 bubbles having a size of 100 μm or more and a $CO_2$ content of more than 5% relative to the total volume of gas in the bubble, per 10 kg of glass. In certain embodiments, the glass product may be free of bubbles having a size of 100 μm or more and a $CO_2$ content of more than 5% relative to the total volume of gas in the bubble, per 10 kg of glass. For example, the glass product may include less than 2 bubbles having a size of 100 μm or more and a $CO_2$ content of more than 10% relative to the total volume of gas in the bubble, per 10 kg of glass. In certain embodiments, the glass product may be free of bubbles having a size of 100 μm or more and a $CO_2$ content of more than 10% relative to the total volume of gas in the bubble, per 10 kg of glass.

In one embodiment of the method, heating the glass raw materials and/or the glass melt includes heating the glass melt volume using one or more electrodes. In another embodiment of the method, heating the glass raw materials and/or the glass melt includes that a major part of the thermal energy is introduced directly into the glass melt. For example, one or more electrodes may be used to heat the glass melt directly. One or more electrodes may be located partially or completely in or on a wall of the melting tank. One or more electrodes may be located partially or completely in or on a bottom plate of the melting tank. In an embodiment, one or more electrodes constitute a wall section and/or a bottom plate section of the melting tank.

In one embodiment of the method, heating the glass raw materials and/or the glass melt may rely to at least 30%, at least 40%, at least 50%, or at least 60%, on hydrogen and oxygen generated through the electrolysis of $H_2O$ and additionally on using one or more electrodes (relative to the total amount of thermal energy). Optionally, heating the glass raw materials and/or the glass melt may rely exclusively on hydrogen and oxygen generated through the electrolysis of $H_2O$ and on using one or more electrodes.

For example, if more thermal energy is needed close to the glass melt surface, longer electrodes can be used. In an embodiment, heating the melt may include heating with one or more electrodes extending upwardly from the bottom of the melting tank up to at least 50% glass melt depth, optionally at least 60%, at least 70% or at least 80% of the glass melt depth. Optionally, the one or more electrodes may extend up to 100%, up to 95% or up to 90% of the glass melt depth from the bottom of the melting tank. Optionally, the one or more electrodes may extend from 50% to 100%, from 60% to 95%, or from 70% to 90% of the glass melt depth from the bottom of the melting tank. In one embodiment of the method, the amount of thermal energy introduced into the glass melt using the at least one fuel burner is at least 30% (relative to the total amount of thermal energy).

In one embodiment of the method, the amount of thermal energy introduced into the glass melt using the one or more electrodes is more than 10% of the total amount of thermal energy introduced into the glass melt in the melting tank.

In one embodiment of the method, the method includes the step of removing bubbles from the glass melt. Removing bubbles from the melt may occur within the melting tank and optionally outside the melting tank, e.g. in a separate vessel. The separate vessel may be a fining vessel. Bubbles may be removed from the melt using chemical and/or physical methods. In one embodiment, removing bubbles from the melt includes that bubbles rise to the glass melt surface in the melting tank. In other embodiments, bubbles are removed from the melt in the melting tank by rising to the glass melt surface, and further bubble removal is performed in a separate vessel afterwards. Owing to the improved method of this invention, bubble removal in the melting tank contributes to achieving excellent bubble quality in the glass product. In further embodiments, the method includes the step of removing bubbles from the glass melt in the melting tank and/or in a separate fining vessel after withdrawing the glass melt made in the melting tank. A temperature of the glass melt in the fining vessel may be higher than the highest temperature of the glass melt in the melting tank. In one embodiment, the method of this invention does not include vacuum fining and/or bubbling the melt. In an alternative embodiment, the method of this invention does include vacuum fining and/or bubbling the melt.

In a second aspect, the present invention relates to a glass product having an $Fe^{2+}$ to $Fe^{3+}$ ratio of less than 0.2, less than 0.15, less than 0.10, or less than 0.05, wherein the glass product has less than 80 bubbles in a size range of from 0.1 mm to 0.2 mm per 10 kg of glass and/or less than 2 bubbles of a size larger than 0.2 mm per 10 kg of glass.

In one embodiment, the glass product exhibits a $CO_2$ solubility of less than $5 \cdot 10^{19}$ molecules $CO_2$ $bar^{-1}$ $cm^{-3}$ glass melt at 1100° C., and/or the glass product has a total carbon content of less than 310 ppm, based on the weight of the carbon atoms with respect to the weight of the glass product In one embodiment, the glass product has a total carbon content of less than 310 ppm, less than 160 ppm, less than 80 ppm, or less than 30 ppm, based on the weight of the carbon atoms with respect to the weight of the glass product. Optionally, the glass product has a total carbon content of at least 1 ppm, at least 2 ppm, at least 3 ppm, or at least 5 ppm, based on the weight of the carbon atoms with respect to the weight of the glass product. In a related embodiment, the glass product has a total carbon content of from 1 to 310 ppm, from 2 to 160 ppm, from 3 to 80 ppm, or from 5 to 30 ppm, based on the weight of the carbon atoms with respect to the weight of the glass product. A glass product having a limited total carbon content as described herein, based on the weight of the carbon atoms with respect to the weight of the glass product, advantageously has fewer bubbles present in the (obtained) glass product and/or has fewer $CO_2$ bubbles present in the (obtained) glass product.

In one embodiment, the glass product has less than 80 bubbles in a size range of from 0.1 mm to 0.2 mm per 10 kg of glass, less than 40 bubbles in a size range of from 0.1 mm to 0.2 mm per 10 kg of glass, less than 10 bubbles in a size range of from 0.1 mm to 0.2 mm per 10 kg of glass, less than 5 bubbles in a size range of from 0.1 mm to 0.2 mm per 10 kg of glass, or less than 2 bubbles in a size range of from 0.1 mm to 0.2 mm per 10 kg of glass, and/or less than 2 bubbles of a size larger than 0.2 mm per 10 kg of glass. In one embodiment, the glass product has less than 5 bubbles in a size range of from 0.1 mm to 0.2 mm per 10 kg of glass. In one embodiment, the glass product has less than 2 bubbles in a size range of from 0.1 mm to 0.2 mm per 10 kg of glass. In a related embodiment, the glass product has less than 2 bubbles with an equivalent spherical diameter of 250 µm or more, 200 µm or more, or 150 µm or more. The feature of a number of bubbles per mass of glass does not mean that any glass product of this disclosure has a weight of at least 10 kg. Instead, the number of bubbles per 10 kg can easily be measured on a lighter glass product. Optionally, the glass product has a mass of at least 1 g, at least 10 g, at least 100 g or at least 250 g. In an embodiment, the glass product may have a mass of 100 kg or less, 25 kg or less, 10 kg or less, 5 kg or less, or 2 kg or less.

In one embodiment, the glass product has a composition with a temperature dependence of the $CO_2$ solubility exceeding $2 \cdot 10^{14}$ molecules $CO_2$ $bar^{-1}$ $cm^{-3}K^{-1}$ in a temperature range of from 1000 to 1600° C. In a further embodiment, the glass product has a composition with a temperature dependence of the $CO_2$ solubility exceeding $5 \cdot 10^{14}$ molecules $CO_2$ $bar^{-1}$ $cm^{-3}$ $K^{-1}$ in a temperature range of from 1000 to 1600° C., or exceeding $1 \cdot 10^{15}$ molecules $CO_2$ $bar^{-1}$ $cm^{-3}$ $K^{-1}$ in a temperature range of from 1000 to 1600° C. In a related embodiment, the temperature dependence of the $CO_2$ solubility is less than $1 \cdot 10^{18}$ molecules $CO_2$ $bar^{-1}$ $cm^{-3}$ $K^{-1}$ in a temperature range of from 1000 to 1600° C., less than $1 \cdot 10^{17}$ molecules $CO_2$ $bar^{-1}$ $cm^{-3}$ in a temperature range of from 1000 to 1600° C., or less than $5 \cdot 10^{16}$ molecules $CO_2$ $bar^{-1}$ $cm^{-3}$ $K^{-1}$ in a temperature range of from 1000 to 1600° C. In related embodiments, the glass product has a composition with a temperature dependence of the $CO_2$ solubility of between $2 \cdot 10^{14}$ molecules $CO_2$ $bar^{-1}$ $cm^{-3}$ $K^{-1}$ and $1 \cdot 10^{18}$ molecules $CO_2$ $bar^{-1}$ $cm^{-3}$ $K^{-1}$ in a temperature range of from 1000 to 1600° C., between $5 \cdot 10^{14}$ molecules $CO_2$ $bar^{-1}$ $cm^{-3}$ $K^{-1}$ and $1 \cdot 10^{17}$ molecules $CO_2$ $bar^{-1}$ $cm^{-3}$ $K^{-1}$ in a temperature range of from 1000 to 1600° C., or between $1 \cdot 10^{15}$ molecules $CO_2$ $bar^{-1}$ $cm^{-3}$ $K^{-1}$ and $5 \cdot 10^{16}$ molecules $CO_2$ $bar^{-1}$ $cm^{-3}$ $K^{-1}$ in a temperature range of from 1000 to 1600° C. This temperature dependence of the $CO_2$ solubility is advantageous as it provides for an optimally degassed glass product in the temperature range of from 1300 to 1650° C.

In one embodiment, the glass product is obtained by and/or obtainable by the methods described herein.

In one embodiment of the glass product, the composition exhibits a viscosity of $10^2$ dPas at a temperature above 1580° C. Advantageously, a glass product with a viscosity of $10^2$ dPas at a temperature above 1580° C. allows for escape of any gases emanating during the production of the glass melt in the manufacturing method of this disclosure. It is of particular advantage when fining agents are used as part of the glass raw materials since their decomposition (at a certain temperature) leads to the formation of gas. Due to partial pressure differences, any gases present in the melt diffuse into the (re)fining agent gas bubbles which grow and rise to the top of the glass melt. At a sufficiently low viscosity of the glass melt, rise of the gas bubbles to the top of the glass melt is facilitated and/or accelerated.

In one embodiment the glass product is a sheet, a wafer, a plate, a tube, a rod, an ingot or a block.

In one embodiment, the carbon dioxide footprint of the glass product is less than 500 g $CO_2$ per kg of glass. In another embodiment, the carbon dioxide footprint of the glass product is less than 400 g, less than 300 g, less than 200 g, less than 100 g or even 0 g of $CO_2$ per kg of glass. For example, a glass product having a carbon dioxide footprint of zero can be made using energy from renewable sources only, e.g. biofuel, hydrogen, or electricity from renewable sources. The carbon dioxide footprint refers to the $CO_2$ emissions resulting from scope 1 emissions according to the GHG protocol. In this context, this refers to the amount of $CO_2$ emission caused by burning fossil fuels and released by carbon containing raw materials during manufacturing of the glass product per kg of glass material.

DETAILED DESCRIPTION OF THE DRAWING

FIG. 1 shows dry measurements (i.e. $H_2O$ is condensed before the gas analysis) of flue gas compositions originating from domestic gas combustion and hydrogen combustion, using oxygen from air fractionation (95.5 vol. % $O_2$, 2 vol. % $N_2$, 2.5 vol. % Ar). The measured dry flue gas composition is recalculated to the original wet composition by the mass balance of the combustion. The experimental setup has a separate melting and fining part, which allows a separate flue gas analysis in both parts. The $NO_x$ fraction is multiplied by 100 to scale on the same ordinate.

EXAMPLES

Method of Making a Glass Product

The described glass products were prepared according to the following procedure: A batch of glass raw materials was mixed and melted in a continuous dioecious melting tank, consisting of a melting part and a fining part. Each part has a volume of approximately 40 litre. Three different compositions relating to the glass products were investigated: A) one glass ceramic, B) one pharmaceutical glass, and C) one optical glass.

| Oxide | A [wt. %] | B [wt. %] | C [wt. %] |
|---|---|---|---|
| $Al_2O_3$ | 20.88 | 5.35 | |
| $As_2O_3$ | | 0.04 | |
| $B_2O_3$ | | 10.5 | 11.3 |
| BaO | 2.29 | | 1.4 |
| CaO | 0.42 | 1.4 | 0.2 |
| Cl | | | 0.3 |
| F | | 0.18 | |
| $Fe_2O_3$ | 0.08 | 0.02 | 0.01 |
| $K_2O$ | 0.22 | | 6.8 |
| $Li_2O$ | 3.71 | | |
| MgO | 0.37 | | |
| $Na_2O$ | 0.59 | 7.11 | 10.0 |
| $Sb_2O_3$ | | | 0.3 |
| $SiO_2$ | 65.14 | 75.3 | 69.5 |
| $SnO_2$ | 0.24 | | |
| $TiO_2$ | 3.1 | 0.02 | 0.05 |
| $V_2O_5$ | 0.03 | | |
| ZnO | 1.5 | | |
| $ZrO_2$ | 1.34 | 0.03 | |
| Sum | 99.91 | 99.95 | 99.86 |

The melting and fining temperature (ranges) were specifically adapted to the corresponding glass product.

| Glass | Melting part | | Fining part | |
|---|---|---|---|---|
| | melt | crown | melt | Crown |
| A | 1510° C. | 1630° C. | 1620° C. | 1635° C. |
| B | 1475° C. | 1570° C. | 1540° C. | 1630° C. |
| C | 1300° C. | 1305° C. | 1400° C. | 1477° C. |

Heating the glass raw materials and the glass melt was done by using one fuel burner for each part, i.e. two separate burners for the melting part and the fining part, and by additional electric heating. The two burners can be independently operated with natural gas, hydrogen, or a defined mixture of hydrogen and natural gas. Pt20Rh plate electrodes were used for electrical heating. Two electrodes (with a size of 225×225×3 mm) and one heating circuit was used in the melting part. Four electrodes (with a size of 125× 125×3 mm) and one heating circuit was used in the fining part. The glass melt was withdrawn from the fining part by a Pt10/Rh drain, after a mean residence time in both the melting part and the fining part of 18.3 hours (A), 16.5 hours (B) or 18.6 hours (C).

The three different glass compositions include an initial amount of iron, e.g. $Fe_2O_3$, given in mol % and in ppm with respect to the batch of glass raw materials. After melting and processing of the glass raw materials into the glass melt and the final glass product, the amount of both $Fe^{2+}$ and $Fe^{3+}$ species has been determined spectroscopically and is given in mol %, and is additionally expressed as ratio $X_{red}$ ($Fe^{2+}/Fe^{3+}$) between the two species.

| A: | | | |
|---|---|---|---|
| Species | mol % | ppm | |
| $Fe_2O_3$ | 0.0372 | 930 | $X_{red}$ |
| $Fe^{2+}$ | 0.00967 | | 0.13 |
| $Fe^{3+}$ | 0.06473 | | |

| B: | | | |
|---|---|---|---|
| Species | mol % | ppm | |
| $Fe_2O_3$ | 0.0068 | 170 | $X_{red}$ |
| $Fe^{2+}$ | 0.00030 | | 0.022 |
| $Fe^{3+}$ | 0.01330 | | |

| C: | | | |
|---|---|---|---|
| Species | mol % | ppm | |
| $Fe_2O_3$ | 0.0048 | 120 | $X_{red}$ |
| $Fe^{2+}$ | 0.00096 | | 0.10 |
| $Fe^{3+}$ | 0.00864 | | |

$CO_2$ Solubility

The $CO_2$ solubility has been measured by vacuum hot extraction after saturation, respectively equilibration, with a defined $CO_2$ partial pressure (cf. PhD thesis of Christopher Charles Tournour, "Solubility and Diffusion of Gases in Glasses and Melts", Alfred University, New York, 2004, chapters 3.2 to 3.4). To this end an apparatus for the saturation of glasses and melts under controlled temperatures and pressures has been used. The apparatus consists of 1½ inch stainless steel vacuum fittings with copper gasket seals. The saturation chamber was either a vitreous silica or mullite tube depending on the saturation temperature used. Gas was supplied to the sample through ¼ inch stainless steel tubing. Swagelock® fittings were used throughout the apparatus. The saturation chamber was evacuated with a direct drive mechanical pump, and the pump pressure was monitored by a thermocouple pressure gauge. A vertically sliding electric resistance furnace was used to heat the vitreous silica saturation chamber, whereas a stationary electric resistance furnace must be used with the mullite tubes due to the greater chance of thermally shocking this material. A type-K thermocouple placed within 1 inch of the specimen was used to monitor the temperature of the glass in the vitreous silica tube, while a digital monometer was used to monitor the system pressure. A type-K thermocouple was used to monitor the temperature in the mullite tube, and was removed prior to saturation of the sample in order to allow enough room for the crucible to be lowered into the tube. A digital monometer was used to monitor the system pressure.

Melt samples are saturated by placing a cube of glass (2 to 4 grams) into a Pt/5Au crucible. The crucible is inserted into a platinum cradle suspended from the top of the saturation chamber by platinum wire. This configuration is then lowered into a mullite tube attached to the saturation system and surrounded by a furnace preheated to approximately 1100° C. Samples are allowed to equilibrate at this temperature while a vacuum is drawn stepwise in 100 Torr increments in order to remove the ambient atmosphere in the tube as well as remove any residual gases and bubbles in the melt. It is necessary to draw the vacuum slowly to avoid foaming of the melt from these gas sources. The furnace temperature is then changed to the desired saturation temperature and the remelted sample is allowed to equilibrate at this new temperature. Once equilibrated, the saturation chamber is filled to the desired pressure with the gas of interest. Melts are held at temperature and pressure for enough time to reach equilibrium after which the dissolved gas is frozen into the sample by rapidly removing the crucible from the saturation chamber and quenching it in water.

Detection of gases that evolved from a sample was performed with a quadrupole mass spectrometer, or a residual gas analyzer (RGA). The gases were introduced to the RGA through a metering valve that controls the rate of gas flow from the sample to the mass spectrometer. A port also exists for introducing gas from a standard volume container in order to calibrate the system and determine absolute gas solubilities.

Outgassing of glasses and melts is carried out by placing a sample in a new platinum crucible not previously exposed to the saturating gas. This crucible is then lowered into the vitreous silica tube attached to the outgassing apparatus. Prior to loading the sample chamber, the vitreous silica tube is heated under vacuum and outgassed to ensure that the only gas detected by the RGA is from the sample. The system is evacuated to approximately $10^{-7}$ Torr in order to remove any ambient atmosphere and five minutes of background data are collected with the RGA before a furnace preheated to the desired outgassing temperature is raised over the sample. Glasses melts were outgassed at 950° C. Specimens were held at temperature long enough for all of the dissolved gas to diffuse out of the glass or melt and into the mass spectrometer system.

Carbon Content

The carbon content has been quantified by IR gas analysis after combustion according to DIN 51085:2015-01, which describes an analogous sulphur content quantification after combustion.

Iron Content

The iron content has been quantified by spectrometric analysis in the final glass product, according to DIN 51001: 2003-08. Specifically, in the final glass product the ratio between $Fe^{2+}$ to $Fe^{3+}$ has been quantified by deconvolution of UV/Vis transmission spectra.

Electrolysis of $H_2O$

Electrolyzing $H_2O$ to obtain hydrogen and oxygen, and delivering at least a part of the hydrogen and a part of the oxygen to the fuel burner was performed by proton exchange membrane (PEM) electrolysis.

Analysis of Flue Gas Compositions

The flue gas is composed of the combustion of the corresponding fuel gas, false air, the gases released from the mixture of glass raw materials and the $O_2$ purging gas used by the furnace chamber probe. A complete combustion to $CO_2$ and $H_2O$ has been assumed. NOR formation is calculated based on nitrogen combustion and using the assumption that only nitrogen monoxide is formed, i.e. thermal NO, also known as Zeldovich-NO. Nitrates form a special case yielding both NO and $NO_2$, i.e. two different reactions take place:

$$Na_2NO_3 \rightarrow Na_2O + NO_2$$

$$Na_2NO_3 \rightarrow Na_2O + NO + \tfrac{1}{2}O_2$$

The resulting flue gas has been dried, in order to remove water, and individual flue gas components have been measured by, respectively, IR spectroscopy in the case of $CO_2$, a paramagnetic $O_2$-analyser in the case of $O_2$, and a chemi-luminescence sensor in the case of NO. Before the NO measurement, all $NO_x$ species were reduced to NO by a $NO_x$-converter. Using the theoretical equations for the combustion of the natural gas taking into account the underlying composition, hydrogen gas, or mixtures thereof, the wet flue gas composition can be derived.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass product, comprising;
   a composition, the glass product having an $Fe^{2+}$ to $Fe^{3+}$ ratio of less than 0.15 and having at least one of less than 80 bubbles in a size range of from 0.1 mm to 0.2 mm per 10 kg of a glass and less than 2 bubbles of a size larger than 0.2 mm per 10 kg of a glass.

2. The glass product according to claim 1, wherein at least one of the composition exhibits a $CO_2$ solubility of less than $5 \cdot 10^{19}$ molecules $CO_2$ $bar^{-1}$ $cm^{-3}$ glass melt at 1100° C. and the glass product has a total carbon content of less than 310 ppm, based on a weight of the carbon atoms with respect to a weight of the glass product.

3. The glass product according to claim 1, wherein the composition has a temperature dependence of the $CO_2$ solubility exceeding $2 \cdot 10^{14}$ molecules $CO_2$ $bar^{-1}$ $cm^{-3}$ $K^{-1}$ in a temperature range of from 1000 to 1600° C.

4. The glass product according to claim 1, wherein the composition exhibits a viscosity of $10^2$ dPas at a temperature above 1580° C.

5. The glass product according to claim 1, wherein the glass product is a sheet, a wafer, a plate, a tube, a rod, an ingot, or a block.

6. The glass product according to claim 1, wherein the glass product has a molar $Fe^{2+}$ to $Fe^{3+}$ ratio of at least 0.005.

7. The glass product according to claim 1, wherein the composition has an alkali metal oxides content of less than 20% by weight.

8. The glass product according to claim 1, wherein the composition comprises $Fe_2O_3$ in an amount of 0.0005% to 0.05% by weight.

9. The glass product according to claim 1, wherein the glass is a borosilicate, alumino-borosilicate, aluminosilicate glass or a lithium aluminosilicate (LAS) glass.

10. The glass product according to claim 1, wherein the glass product comprises less than 2 bubbles having a size of at least 100 μm and a $CO_2$ content of more than 10% relative to a total volume of gas in a bubble, per 10 kg of the glass.

11. A glass product, comprising;
    a composition, the composition having a $CO_2$ solubility of less than $5 \cdot 10^{19}$ molecules $CO_2$ $bar^{-1}$ $cm^{-3}$ glass melt at 1100° C. and a total carbon content of 10 to 310 ppm, based on a weight of a plurality of carbon atoms with respect to a weight of the glass product.

12. The glass product according to claim 11, wherein the composition has a temperature dependence of the $CO_2$ solubility exceeding $2 \cdot 10^{14}$ molecules $CO_2$ $bar^{-1}$ $cm^{-3}$ $K^{-1}$ in a temperature range of from 1000 to 1600° C.

13. The glass product according to claim 11, wherein the glass product comprises less than 2 bubbles having a size of at least 100 μm and a $CO_2$ content of more than 10% relative to a total volume of gas in a bubble, per 10 kg of glass.

14. The glass product according to claim 11, wherein the composition exhibits a viscosity of $10^2$ dPas at a temperature above 1580° C.

15. The glass product according to claim 11, wherein the glass product is a sheet, a wafer, a plate, a tube, a rod, an ingot, or a block.

16. The glass product according to claim 11, wherein the glass product has a molar $Fe^{2+}$ to $Fe^{3+}$ ratio of from 0.005 to 0.2.

17. The glass product according to claim 11, wherein the composition has an alkali metal oxides content of less than 20% by weight.

18. The glass product according to claim 11, wherein the composition comprises $Fe_2O_3$ in an amount of 0.0005% to 0.05% by weight.

19. The glass product according to claim 11, wherein the glass is a borosilicate, alumino-borosilicate, aluminosilicate glass or a lithium aluminosilicate (LAS) glass.

* * * * *